United States Patent [19]

Raybon

[11] Patent Number: 4,679,807
[45] Date of Patent: Jul. 14, 1987

[54] WHEELCHAIR CART

[76] Inventor: Johnny D. Raybon, 509 Lubbock Rd., Brownfield, Tex. 79316

[21] Appl. No.: 896,758

[22] Filed: Aug. 14, 1986

[51] Int. Cl.⁴ .............................................. B62C 1/02
[52] U.S. Cl. ..................................... 280/65; 180/907; 280/47.25; 280/204; 280/289 WC; 410/3; 414/921
[58] Field of Search .................. 280/63, 256, 680, 67, 280/70, 47.25, 242 WC, 203, 204, 289 WC, 65, 32.7; 180/907, 215, 211; 410/3, 4, 51; 414/437, 480, 921

[56] References Cited

U.S. PATENT DOCUMENTS

| 28,796 | 6/1860 | Walker | 280/63 |
|---|---|---|---|
| 347,369 | 1/1883 | Anderson | 280/63 |
| 376,962 | 1/1888 | Olmsted | 280/70 |
| 3,025,985 | 3/1962 | Crawford | 414/537 |
| 3,204,791 | 9/1965 | Williams | 180/65.1 |
| 3,271,048 | 9/1966 | Beesley et al. | 280/63 |
| 3,388,921 | 6/1968 | Pickard | 280/63 |
| 3,840,085 | 10/1974 | Smith | 280/204 |
| 3,912,292 | 10/1975 | Lichfield | 280/63 |
| 3,921,740 | 11/1975 | Forster | 180/907 |
| 4,415,056 | 11/1983 | Smith | 280/203 |
| 4,470,610 | 9/1984 | Wilson | 280/63 |
| 4,505,490 | 3/1985 | Plugge | 280/47.25 |
| 4,580,652 | 4/1986 | Turner et al. | 280/203 |

*Primary Examiner*—David M. Mitchell
*Assistant Examiner*—Brian L. Johnson
*Attorney, Agent, or Firm*—Wendell Coffee

[57] ABSTRACT

A sulky or horse cart has a low floor. A wheelchair carrying a paraplegic may be rolled from the ground onto the low floor. Hooks on the floor provide a means for locking the wheelchair to the floor. Other features include a roll bar to protect the rider and shock absorbers for comfort.

10 Claims, 7 Drawing Figures

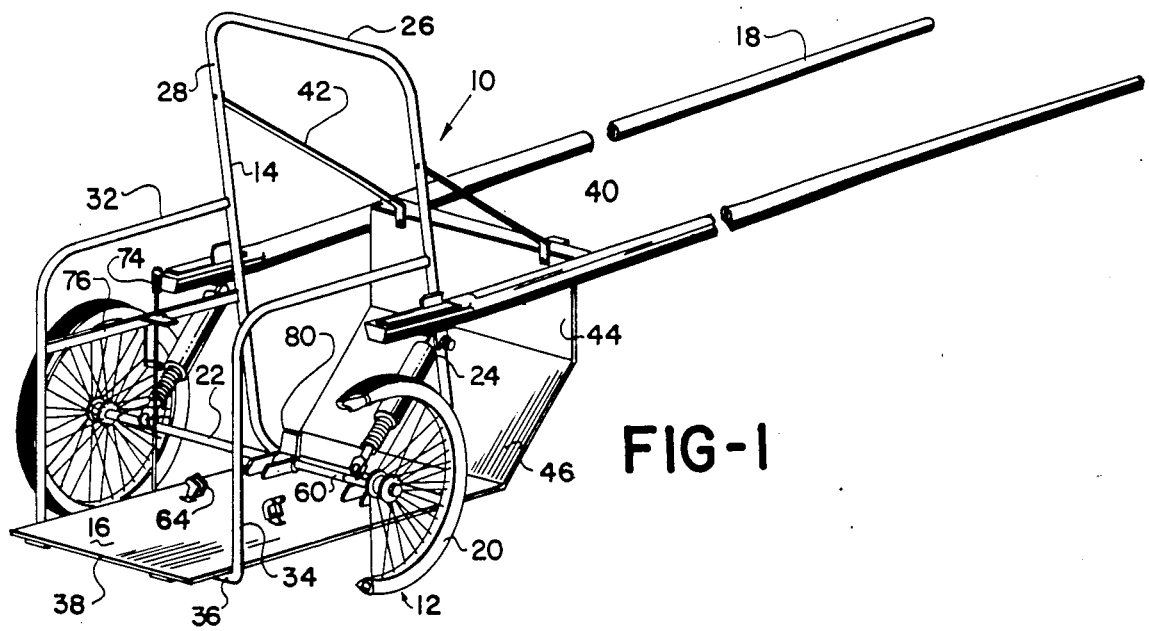
FIG-1
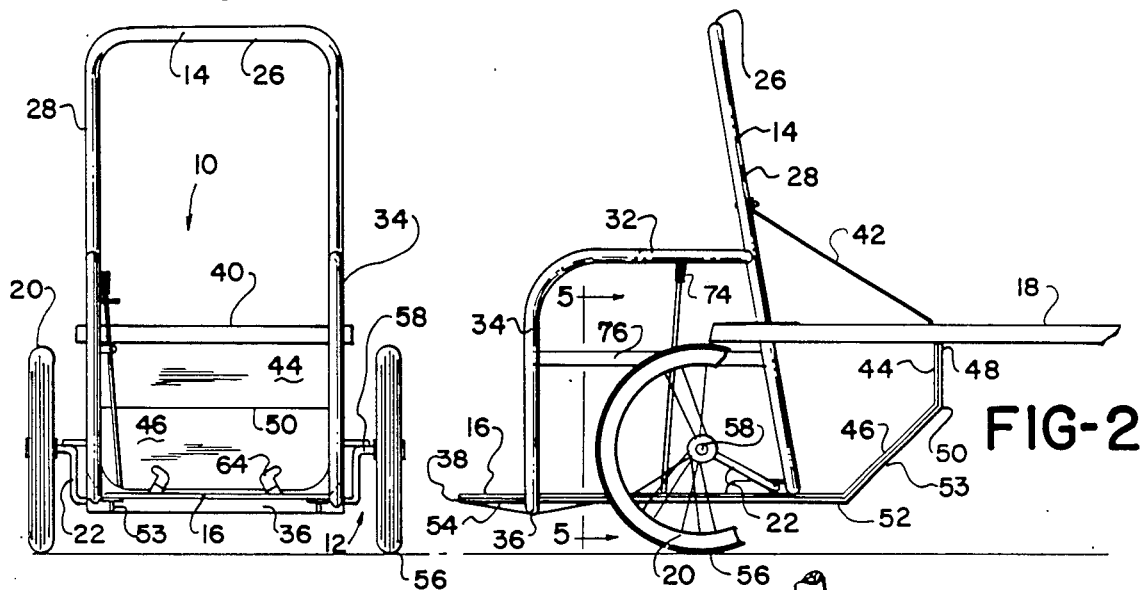
FIG-2
FIG-4
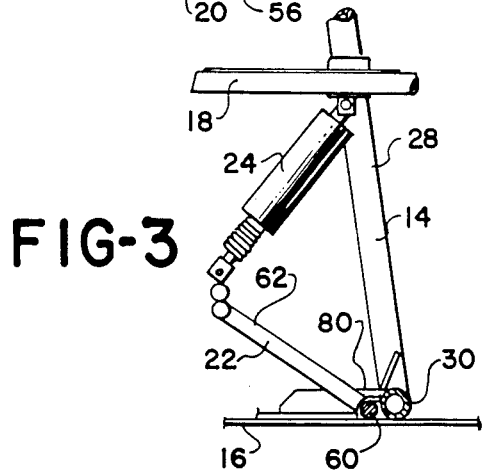
FIG-3

WHEELCHAIR CART

RIGHTS TO INVENTIONS UNDER FEDERAL RESEARCH

There was no federally sponsored research and development concerning this invention.

BACKGROUND OF THE INVENTION (1) Field of the Invention

This invention relates to sulkies or horse drawn carts and more particularly to sulkies intended for use by wheelchair-bound people.

(2) Description of the Related Art

Previous efforts have been made to provide recreational riding vechicles for paraplegics or other people confined to wheelchairs. Often these vehicles consisted of a little more than a chair mounted upon a sulky or a cart and the person was removed from the wheelchair and lifted to the chair.

Before this application was filed, a search was made in the United States Patent and Trademark Office. That search developed the following patents:

| | |
|---|---|
| WALKER | 28,796 |
| CRAWFORD | 3,025,985 |
| BEESLEY ET AL | 3,271,048 |
| PICKARD | 3,388,921 |
| LICHFIELD | 3,912,292 |
| WILSON | 4,470,610 |
| PLUGGE | 4,505,490 |

Several of these patents possess features also found on my invention. CRAWFORD discloses a two wheel vehicle having a "drive-on" ramp. LICHFIELD discloses a horse drawn vehicle with a chariot body including springs and a mud guard. BEESLEY and WILSON disclose sulky like vehicles which include handrails. PICKARD discloses a sulky having springs. The remaining references are cited for general interest.

These patents are considered pertinent because the applicant believes the Examiner would consider anything revealed by the search to be relevant and pertinent to the examination of this application.

SUMMARY OF THE INVENTION (1) Progressive Contribution to the Art

Riding in a sulky is a pleasurable activity that allows that participant to be around horses. Paraplegics and other wheelchair-bound individuals would also like to enjoy this activity, but have difficulty in getting on and off of the sulky. My invention involves a modified sulky which permits the paraplegic to roll himself onto it and lock the wheelchair in place. The paraplegic can then drive the horse from the wheelchair. When the term paraplegic is used in this document, it is used nontechnically to refer to any person that requires a wheelchair for ambulation.

Basically the invention includes a body which includes a roll bar to protect the paraplegic. It will be understood that normally the paraplegic will be strapped to the wheelchair and his wheelchair locked on the vehicle. Therefore, he is particularly susceptible to injury in the event the sulky rolls over. It is highly desirable to protect him.

The sulky includes the protecting framework of the body and running gear which includes wheels which are mounted by shock absorbers and springs to the body. The vehicle body has a low floorboard or floor panel with locking means upon the floor so that the wheelchair can be locked in place. Preferably a lever for locking the wheelchair in place is within the reach of the paraplegic so that he may perform many of these activities himself. Stated otherwise, it is not necessary for a person to wheel the paraplegic upon the floorboards and lock him in position, but he paraplegic can perform these things himself.

However, in many cases where these activities are to be conducted the persons operating the facilities will not wish to permit the paraplegic to drive the horse himself. Therefore, in many instances, it will be desired to have the body of the sulky large enough to carry two persons so that a person may accompany the paraplegic to drive the horse.

(2) Objects of this Invention

An object of this invention is to permit a wheelchair-bound individual to participate in a wider range of activities relating to horses.

Futher objects are to achieve the above with a device that is sturdy, compact, durable, lightweight, simple, safe, efficient, versatile, ecologically compatible, energy conserving, and reliable, yet inexpensive and easy to manufacture, operate and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWINGS

FIG. 1 is perspective view of an embodiment of this invention.

FIG. 2 is a side elevational view of the embodiment with the shafts broken away for clarity.

FIG. 3 is a detailed view of the suspension of the running gear.

FIG. 4 is a rear elevational view of the embodiment shown in FIG. 1.

Figure 6:
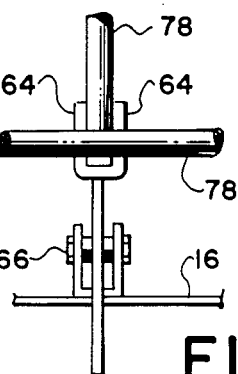
FIG. 6 is a further detailed view of the wheelchair locking mechanism taken substantially along line 6—6 of FIG. 5.
Figure 5:
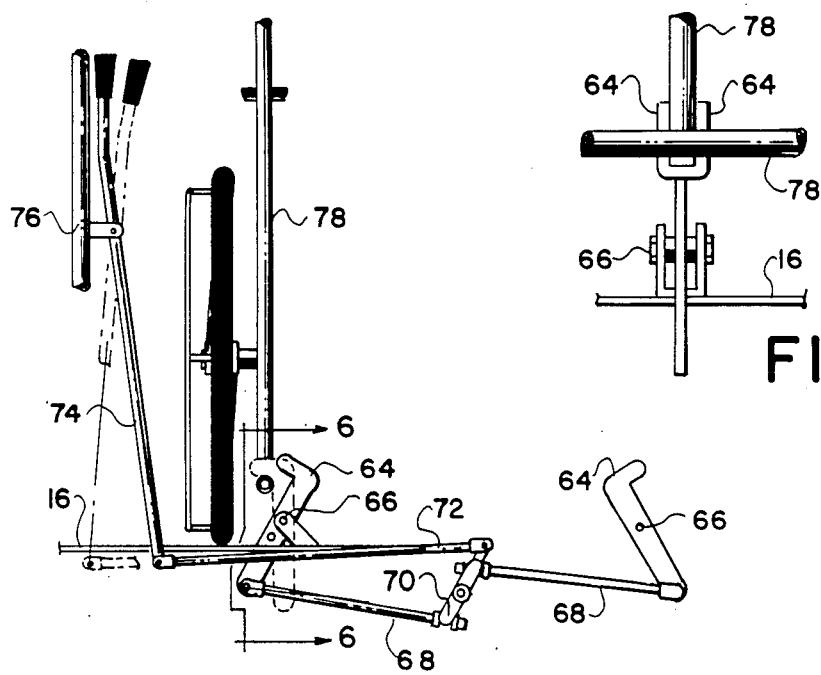
FIG. 5 is a detailed view of the locking mechanisms with a portion of the wheelchair shown taken substantially along line 5—5 of FIG. 2.

As an aid to correlating the terms describing this invention to the exemplary drawing the following catalog of elements is provided:

| Catalog of Elements |
|---|
| 10 body |
| 12 running gear |
| 14 roll loop |
| 16 floor panel |
| 18 horse shafts |
| 20 wheels |
| 22 "U" frame |
| 24 shocks |
| 26 roll bar |
| 28 sides (loop) |
| 30 loop bottom |
| 32 handrails |
| 34 stanchions |
| 36 handrail bottom |
| 38 floor rear |
| 40 cross bar |
| 42 braces |

-continued

| Catalog of Elements |
|---|
| 44 vertical panel |
| 46 sloping panel |
| 48 top of panel |
| 50 joint |
| 52 floor front |
| 53 bottom frame |
| 54 gussets |
| 56 wheel bottom |
| 58 stub axle |
| 60 bight |
| 62 distal ends |
| 64 hooks |
| 66 pivot pin |
| 68 hook pitman |
| 70 bell crank |
| 72 lever pitman |
| 74 lever |
| 76 lever bar |
| 78 wheelchair |
| 80 wheel positioners |

DESCRIPTION OF THE PREFERRED EMBODIMENTS

Referring to the drawings there may be seen an embodiment of my improved chariot or sulky. Basically the sulky has two main assemblies. It has a body assembly 10 and a running gear assembly 12. The body assembly includes roll loop 14, floor panel 16, and horse shafts 18. The running gear includes wheels 20 with "U" shaped frame 22 and shock absorbers 24.

Specifically, describing the body 10 in more detail, the roll loop 14 is a rectangular tubular structural member having roll bar 26 at the top of the roll loop, loop sides 28, and loop bottom 30.

Handrails 32 are attached to each of the loop sides 28 about halfway between the roll bar 26 and the loop bottom 30. The rails 32 extend horizontally rearward to stanchions 34 at the rear of the body 10. They are connected across the bottom by handrail bottom 36. The handrail bottom 36 will extend below floor rear 38, which is of course the rear of the floor panel 16.

The horse shafts 18 are attached below the handrails, as seen in FIGS. 1 and 2 and extend forward to provide means for hitching a horse to the sulky. The particular details of the horse hitching structure has not been shown inasmuch as it is identical to the shafts as used in regular sulkies. Cross bar 40 connects the shafts 18 forward of the roll loop 14. Braces 42 extend from the cross bar 40 to the loop sides 28 about halfway between the handrails 32 and the roll bar 26.

The dashboard includes two parts, vertical panel 44 and sloping panel 46. Top 48 of the vertical panel 44 is securely attached to the cross bar 40. Joint 50 between the vertical panel 44 and the sloping panel 46 securely attaches these two panels together. The sloping panel 46 slopes from the joint 50 rearwardly to floor front 52. Metal bottom frame 53 extends to the exterior or bottom of the cross bar 40 along the vertical panel 44, sloping panel 46, and beneath the floor panel 16 to the extreme floor panel rear 38. There are two straps or rods forming the bottom frame 53. Gussets 54 are forward and rear of the handrail bottom 36.

Particularly referring to FIG. 2, it may be seen that the floor panel 16 is very close to the ground. In fact, referring to the wheels 20 which have wheel bottom 56 and a stub axle 58 at the center of the wheel, it may be seen that the floor panel is closer to the wheel bottom 56 than it is to the stub axle 58. Therefore, if the sulky is ridden over rough terrain, the bottom panel might at times strike irregularities of the earth. However, by having the dashboard slope at the bottom of the sloping panel 46 the sulky will ride over the rough terrain like a sled rather than striking any obstruction with a vertical member. Also the gussets 54 will prevent the handrail bottom 36 from catching on any obstruction. Also the bottom frame 53 provides a structural member to which the cross bar 40 may be attached and also the loop bottom 30 and the handrail bottom 36 as well as bight 60 of the "U" frame 22 as will be explained later. With the bottom frame 53 being the main structural member, the floor panel can be made of plywood of only medium strength and the dashboard, including the vertical panel 44 and sloping panel 46, of light plywood.

Thus, it may be seen that a rigid body is provided which includes the elements of the roll loop 14, floor panel 16, the horse shafts 18, and the bottom frame 53.

The bight 60 of the "U" frame 22 is mounted for rotation to the floor panel 16 at the forward portion or front 52. As seen in FIG. 3, it will be mounted parallel to and contacting the loop bottom 30. The "U" shaped frame 22 will have distal ends 62 to which the stub axis 58 are attached. The wheels 20 are journaled to the stub axles.

The shock absorbers 24 are in the form of combination springs and shock absorbers as are well known and available on the market. The lower portion fits to the running gear at distal ends 62 of the "U" frame. Since the "U" frame 22 is pivoted at the bight 60, it may be seen that the stub axles and thus the wheels are free to move up and down to absorb bumps and shocks. The top of the shock absorbers 24 are attached to the body 10. Specifically, they are attached to the roll loop 14 immediately below or at the shafts 18. It will be understood that the shock absorber 24 is a resilient structural means to connect the body to the running gear. It may be seen, particularly referring to the drawings, that the body is completely open at the back so that a wheelchair may be readily wheeled or rolled, with the person therein, onto the floor panel from the rear 38. Also, it will be noticed that all of the wheels and shock absorbers are to one side of the other leaving a clear space for the wheelchair and its occupants.

A means for locking the wheelchair to the floor panel is provided. The locking means include two hooks 64 which are mounted about a fore and aft pivot pin 66. It will be understood that it being fore and aft will make the pin 66 parallel to the handrails 32 and to the shafts 18. The hooks 64 in the unlocked position will be inboard of the wheelchair frame and in the locked position they will be moved outboard. Each of the hooks 64 extends below the pivot point to below the floor panel 16. There the bottom of each hook is connected by hook pitman 68 to bell crank 70 which is pivoted to the bottom floor panel 16. The bell crank extends above and below its pivot point.

The hook pitman 68 from one hook 64 is attached below the pivot point, the other hook pitman 68 is attached to above the pivot point so that both hooks operate in unison either moving inboard or outboard according to the position of the bell crank 70. The position of the bell crank is controlled by lever pitman 72 which extends from the bell crank 70 to the bottom of the operating lever 74. The operating lever is connected to lever bar 76 which is attached to the body between the roll loop 14 and the stanchions 34 on one side.

It is emphasized that each hook 64 is biforcated particularly as seen in FIG. 6 and that the one portion of the hook goes forward of the standard frame members of the standard wheelchair 78 and the other biforcation of the hook 64 goes behind certain cross frame members of a standard wheelchair frame 78. Therefore, with the chair locked in place, it can move neither forward nor backward.

It will be noted that the sulky described and particularly shown in FIGS. 1 and 4 is for a single wheelchair. Although it might be possible for a driver to stand up and ride with the paraplegic in a wheelchair, there is really no position for a second person on the vehicle.

Figure 7:
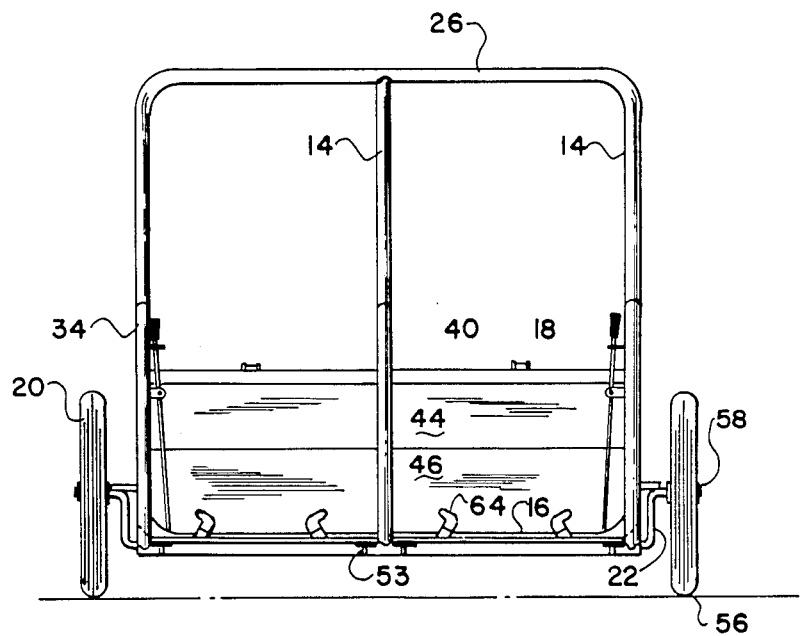
FIG. 7 is a rear elevational view of a double rider embodiment, being a second embodiment.

Therefore, a second embodiment is shown in FIG. 7. It too would have a means for carrying at least one wheelchair. Actually, it is shown with means for carrying two wheelchairs, one to the right and one to the left. Also it will be understood that seldom would two wheelchairs be carried on the sulky at one time. More likely either a regular driver's seat would be provided to the right or the left so that a driver could accompany the paraplegic in a wheelchair while in use. However, by providing two locking mechanisms for the right or the left, obviously there will be an option in operation in that the sulky could carry in certain instances two wheelchairs. This would be particularly true if one of the people in the wheelchair had sufficient physical ability to handle the horse comfortably so that not only he could have his own safety at risk but also that of passenger.

Although all of the details of the description have not been shown, those having ordinary skill in the art will understand the construction. For example, the wheel positioners 80 are shown immediately to the rear of the bight 60. These are for positioning the front wheels of the wheelchair so that, in addition to having the wheelchair locked down, the wheelchair can be positioned with the wheels in place so that the hooks will fit properly at the right place upon the frame of the chair.

It will be understood that many details of the construction have not been shown. For example, the guards at the bottom to protect the lock mechanism from weeds and other obstructions along the ground have not been shown but can be provided by those having ordinary skill in the art. Likewise, those having ordinary skill will understand that a safety latch to hold the lever 74 in position, so that accidental movement does not cause the lever to unlock the hooks releasing the wheelchair, will be provided.

The embodiments shown and described above are only exemplary. I do not claim to have invented all the parts, elements, or steps described. Various modifications can be made in the construction, material, arrangement, and operation, and still be within the scope of my invention.

The restrictive description and drawing of the specific examples above do not point out what an infringement of this patent would be, but are to enable one skilled in the art to make and use the invention. The limits of the invention and the bounds of the patent protection are measured by and defined in the following claims.

I claim as my invention:

1. A sulky having:
    a "U" shaped frame having a bight and two distal ends,
    a stub axle, connected to each distal end of the "U" shaped frame,
    a wheel journaled to each of the stub axles,
    two horizontal shafts for a horse extending forward of the wheels,
    WHEREIN THE IMPROVEMENT COMPRISES:
    a floor having a rear and front portion,
    said front portion of the floor connected to the bight of the "U" shaped frame,
    a roll bar frame connected to the shafts and connected to the front portion of the floor and extending upward therefrom,
    a horizontal roll bar at the top of the roll bar frame,
    a horizontal handrail on each side of the sulky,
    each handrail attached to and extending rearward of the roll bar,
    the rear of each handrail connected to the rear of the floor, and
    lock means on the floor for locking at least one wheelchair to the floor.

2. The invention as defined in claim 1 further comprising:
    a dashboard having a top and bottom,
    a cross bar at the top of the dashboard,
    the cross bar connected on either side to one of the shafts, and
    the bottom of the dashboard connected to the front portion of the floor.

3. The invention as defined in claim 1 further comprising:
    a shock absorber assembly at each side of the sulky,
    said shock absorber assembly extending from near the distal end of the "U" shaped member to the roll bar frame near the shafts.

4. The invention as defined in claim 1 further comprising:
    there being two of said lock means on the floor so that two wheelchairs can be mounted upon the floor of the sulky.

5. The invention as defined in claim 2 further comprising:
    a brace extending from the roll bar frame to the cross bar.

6. The invention as defined in claim 2 further comprising:
    the lower portion of the dashboard being angled rearwardly to help guide the sulky over rough terrain.

7. The invention as defined in claim 1 wherein:
    said wheels have a bottom and a top,
    said floor mounted at a level between the bottom of the wheel and the stub axle.

8. The invention as defined in claim 7 further comprising:
    where the handrails are above the level of the top of the wheels.

9. A sulky having:
    a rigid body including
        i. a floor panel with a front and a back,
        ii. a dashboard having a top and a bottom,
        iii. the bottom the dashboard connected to the front of the floor panel,
        iv. a cross bar at the top of the dashboard,
        v. a roll frame in the form of a rectangular loop having a top, bottom, and two sides,
        vi. the bottom connected to the floor panel near the front,
        vii. the top of the roll bar loop extending above the floor panel, viii. a shaft connected to each of the sides of the loop and connected to one side of the cross bar and extending forward to form a means for hitching a horse to the sulky,
ix. a brace on each side extending from the cross bar to the side of the roll bar loop,
x. horizontal handrails on each side attached to the side of the roll bar loop above the shaft,
xi. stanchions at the back of the handrails extending to below the floor panel, and
xii. said stanchions connected together by structural members below the floor panel at the rear thereof, running gear including:
i. a "U" shaped frame having a bight and two distal ends,
ii. a stub axle connected to each distal end of the "U" shaped frame,
iii. a wheel journaled to each of the stub axles,
iv. resilient structural means connecting the distal ends of the "U" shaped frame to the rigid body, and
v. said bight mounted for rotation about said bight to the forward portion of the floor panel adjacent to the bottom of the roll loop, and lock means on the floor panel for locking at least one wheelchair to the floor.

10. The invention as defined in claim 9 further comprising: lever means adjacent to one of the handrails operatively connected to said lock means for operation thereof.

* * * * *